(12) United States Patent
Sakamoto et al.

(10) Patent No.: US 11,956,070 B2
(45) Date of Patent: Apr. 9, 2024

(54) OPTICAL TRANSMISSION SYSTEM

(71) Applicant: NIPPON TELEGRAPH AND TELEPHONE CORPORATION, Tokyo (JP)

(72) Inventors: Taiji Sakamoto, Musashino (JP); Masaki Wada, Musashino (JP); Takashi Yamamoto, Musashino (JP); Kazuhide Nakajima, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 106 days.

(21) Appl. No.: 17/760,541

(22) PCT Filed: Sep. 17, 2019

(86) PCT No.: PCT/JP2019/036318
§ 371 (c)(1),
(2) Date: Mar. 15, 2022

(87) PCT Pub. No.: WO2021/053709
PCT Pub. Date: Mar. 25, 2021

(65) Prior Publication Data
US 2022/0360358 A1    Nov. 10, 2022

(51) Int. Cl.
*H04J 14/04* (2006.01)
*H04B 7/0413* (2017.01)
(Continued)

(52) U.S. Cl.
CPC ............ *H04J 14/04* (2013.01); *H04B 7/0413* (2013.01); *H04B 10/07953* (2013.01); *H04B 10/2581* (2013.01)

(58) Field of Classification Search
CPC ............ H04B 7/0413; H04B 10/07953; H04B 10/2581
See application file for complete search history.

(56) References Cited

U.S. PATENT DOCUMENTS

2017/0207850 A1* 7/2017 Takahashi ............... H04B 10/60
2020/0067624 A1* 2/2020 Tsuzuki ............. H04Q 11/0066

FOREIGN PATENT DOCUMENTS

JP        2017152811 A   *  8/2017

OTHER PUBLICATIONS

Hidehiko Takara et al., 1.01-Pb/s (12 SDM/222 WDM/456 GB/s) Crosstalk-managed Transmission with 91.4-b/s/Hz Aggregate Spectral Efficiency, ECOC 2012, Sep. 16, 2012.
(Continued)

*Primary Examiner* — Pranesh K Barua
(74) *Attorney, Agent, or Firm* — Harness, Dickey & Pierce, P.L.C.

(57) ABSTRACT

An object of the present invention is to provide an optical transmission system capable of controlling a transmission capacity and a signal processing load of a MIMO equalizer, without depending on the number of propagation modes of the optical fiber. The present optical transmission system includes an optical fiber 11 with the number of spatial modes being L (an integer of 2 or greater), an optical multiplexer 13 connected to one end of the optical fiber 11 and configured to input M (a natural number of L or less) signal beams of light to the optical fiber 11 and cause the M input signal beams of light to be propagated for each of the spatial modes of the optical fiber 11, an optical demultiplexer 14 connected to another end of the optical fiber 11 and configured to demultiplex a propagated beam of light propagated through the optical fiber 11 for each of the spatial modes of the optical fiber 11, N (N=L) receivers 15 configured to each receive a demultiplexed beam of light obtained by demultiplexing the propagated beam of light, a signal generation apparatus 17 configured to generate P (an integer of from M to L) combined signals from the N received signals, and a
(Continued)

P×M MIMO equalizer 16 configured to receive the P combined signals to output M demodulated signals.

16 Claims, 14 Drawing Sheets

(51) Int. Cl.
  *H04B 10/079* (2013.01)
  *H04B 10/2581* (2013.01)

(56) References Cited

OTHER PUBLICATIONS

Taiji Sakamoto et al., Differential Mode Delay Managed Transmission Line for WDM-MIMO System Using Multi-Step Index Fiber, Journal of Lightwave Technology, vol. 30, No. 17, 2012, pp. 2783-2787.

Yusuke Sasaki et al., Large-effective-area uncoupled few-mode multi-core fiber, ECOC 2012, Sep. 16, 2012.

Taiji Sakamoto et al., Twisting-rate-controlled 125 μm Cladding Randomly coupled Single-mode 12-core Fiber, Journal of Lightwave Technology, vol. 36, No. 2, 2018, pp. 325-330.

Nobutomo Hanzawa et al., Demonstration of mode-division multiplexing transmission over 10 km two-mode fiber with mode coupler, OFC 2011, Mar. 6, 2011.

H. Uemura et al., Fused Taper Type Fan-in/Fan-out Device for 12 Core Multi-Core Fiber, OECC/ACOFT 2014, Jul. 6, 2014, pp. 49-50.

Michael G. Taylor, Coherent Detection for Fiber Optic Communications Using Digital Signal Processing, Optical Amplifiers and Their Applications/Coherent Optical Technologies and Applications, Jun. 25, 2006.

Sebastian Randel et al., MIMO-based signal processing for mode-multiplexed transmission, IEEE Summer Topical Meeting, Jul. 9, 2012.

Taiji Sakamoto et al., Strongly-coupled multi-core fiber and its optical characteristics for MIMO transmission systems, Optical Fiber Technology, vol. 35, 2017, pp. 8-18.

\* cited by examiner (a)　　　　　　　　(b)　　　　　　　　(c)

[13]

OPTICAL TRANSMISSION SYSTEM

CROSS-REFERENCE TO RELATED APPLICATIONS

This application is a 371 U.S. National Phase of International Application No. PCT/JP2019/036318, filed on Sep. 17, 2019. The entire disclosure of the above application is incorporated herein by reference.

TECHNICAL FIELD

The present disclosure relates to an optical transmission system using spatial multiplexing optical fibers.

BACKGROUND ART

In an optical fiber communication system, transmission capacity is limited by non-linear effects or a fiber fuse generated in optical fibers. In order to mitigate such limitations, spatial multiplexing technologies are under study, such as parallel transmission using a multi-core fiber containing a plurality of cores in one optical fiber (NPL 1), mode-multiplexing transmission using a multi-mode fiber in which a plurality of propagation modes are present in a core (NPL 2), and a few-mode multi-core fiber combining multi-core and mode-multiplexing (NPL 3).

In the multi-core fiber, in order to reduce crosstalk between signals propagating between the cores, each of the cores can be used as an independent transmission line with a distance of constant value or greater between cores (for example, 30 μm or greater). On the other hand, in transmission using the multi-mode fiber, such crosstalk occurs between the propagation modes due to a connection point in the transmission line and a fiber bending, and thus, a multiple-input multiple-output (MIMO) equalizer that compensates for an inter-mode crosstalk at a reception end is used. In a multi-core structure, a method has also been proposed in which crosstalk between cores is allowed, and a coupled multi-core fiber (with a core spacing of generally 25 μm or less) is used to compensate for crosstalk between the cores by using the MIMO equalizer similarly to the multi-mode fiber transmission (for example, NPL 4).

CITATION LIST

Non Patent Literature

NPL 1: H. Takara et al., "1.01-Pb/s (12 SDM/222 WDM/456 Gb/s) Crosstalk-managed Transmission with 91.4-b/s/Hz Aggregate Spectral Efficiency," in ECOC2012, paper Th.3.C.1 (2012)

NPL 2: T. Sakamoto et al., "Differential Mode Delay Managed Transmission Line for WDM-MIMO System Using Multi-Step Index Fiber," J. Lightwave Technol. vol. 30, pp. 2783-2787 (2012).

NPL 3: Y. Sasaki et al., "Large-effective-area uncoupled few-mode multi-core fiber," ECOC2012, paper Tu.1.F.3 (2012).

NPL 4: T. Sakamoto et al., "Twisting-rate-controlled 125 μm Cladding Randomly-coupled Single-mode 12-core Fiber," J. Lightwave Technol. vol. 36, Issue 2, pp. 325-330 (2018).

NPL 5: N. Hanzawa et al., "Demonstration of mode-division multiplexing transmission over 10 km two-mode fiber with mode coupler," OFC2011, paper OWA4 (2011)

NPL 6: H. Uemura et al, "Fused Taper Type Fan-in/Fan-out Device for 12 Core Multi-Core Fiber," OECC2014, pp. 49-50 (2014).

NPL 7: M. Taylor, "Coherent Detection for Fiber Optic Communications Using Digital Signal Processing," in Optical Amplifiers and Their Applications/Coherent Optical Technologies and Applications, Technical Digest (CD) (Optical Society of America, 2006), paper CThB1.

NPL 8: S. Randel et al., "MIMO-based signal processing for mode-multiplexed transmission," Proc. IEEE Summer Topical Meeting, MC4.1 Seattle (2012).

NPL 9: T. Sakamoto et al., "Strongly-coupled multi-core fiber and its optical characteristics for MIMO transmission systems," Optical Fiber Technology, 35, Pages 8-18 (2017)

SUMMARY OF THE INVENTION

Technical Problem

Existing MIMO transmission systems using an L mode fiber use a transmission system including L transceivers and an L×L MIMO equalizer.

In this case, if one transceiver is a device that transmits and receives polarization multiplexed signals, the optical fiber is designed to propagate L spatial modes (that is, designed to propagate 2L modes combined with polarization and spatial modes), and a 2L×2L MIMO equalizer is employed on a reception side. As used herein, unless otherwise specified, signal beam of light is a polarization multiplexed signal, and the number of modes refers to a total number of polarization and spatial modes.

In transmission using multi-mode fibers or coupled multi-core fibers, the MIMO equalizer is required, and a transmission capacity, a signal quality, a MIMO signal processing load, and the like of a transmission system to be constructed are determined depending on the number of propagation modes of the optical fiber to be installed. That is, in the optical fiber propagating an L mode, a system is constructed to transmit L signals in parallel by using an L×L MIMO equalizer.

Here, a problem of a transmission system using the MIMO equalizer will be described. In a case of a wavelength-division multiplexing transmission system using single mode fibers having low loss characteristics in a wide wavelength, the capacity can be gradually increased by controlling the number of multiplexed wavelengths depending on a capacity demand, and a load on the device side can also be gradually increased by preparing a required transceiver accordingly.

On the other hand, in a transmission system employing the MIMO equalizer, if a system is constructed using optical fibers including more propagation modes allowing for future increases in capacity demand, it is necessary to employ a MIMO equalizer in accordance with the number of modes. The MIMO equalizer is known to increase the signal processing load in proportion to the square of the number of modes. That is, the transmission system employing the MIMO equalizer has a problem in that the transmission capacity and the signal processing load of the MIMO equalizer are determined by the number of propagation modes of the optical fiber, making it difficult to adapt to changes in the transmission capacity and the required quality.

Thus, in order to solve the problems described above, an object of the present invention is to provide an optical transmission system capable of controlling a transmission capacity and a signal processing load of a MIMO equalizer, without depending on the number of propagation modes of the optical fiber.

Means for Solving the Problem

In order to achieve the above object, in the optical transmission system according to the present invention, the number of inputs and outputs of signal beams of light to and from an optical fiber that allows spatial multiplexing transmission is adjusted as a variable parameter, and a signal is appropriately generated on the reception side to control a transmission capacity and a signal quality of the optical transmission system.

Specifically, an optical transmission system according to the present invention includes an optical fiber with the number of spatial modes being L (L is an integer of 2 or greater),
- an optical multiplexer connected to one end of the optical fiber and configured to input signal beams of light from M transmitters (M is a natural number of L or less) to the optical fiber and cause the input signal beams of light to be propagated for each of the spatial modes of the optical fiber,
- an optical demultiplexer connected to another end of the optical fiber and configured to demultiplex a propagated beam of light propagated through the optical fiber for each of the spatial modes of the optical fiber,
- N (N=L) receivers configured to each receive a demultiplexed beam of light obtained by demultiplexing the propagated beam of light by the optical demultiplexer,
- a signal generation apparatus configured to receive N received signals output from the N receivers to generate P combined signals (P is an integer of from M to L) from the N received signals, and
- a P×M multiple-input multiple-output (MIMO) equalizer that receives the P combined signals output from the signal generation apparatus to output M demodulated signals.

The present optical transmission system is provided with the P×M MIMO equalizer, includes the receivers (N units) the number of which is equal to the number L of spatial multiplexing of the optical fiber, and changes the number M of the signal beams of light transmitted through the optical fiber in the range of the number L of spatial multiplexing or less. The adjustment of the number M of signal beams of light makes it possible to adjust the transmission capacity and the signal quality of the optical transmission system even after construction of the transmission line, thus allowing performance to be changed without changing the system configuration. Furthermore, the present optical transmission system generates the P combined signals from the L received signals received from the receivers. Changing the method of generating the combined signals or the number P makes it possible to change the performance, without changing the system configuration.

Consequently, according to the present invention, it is possible to provide an optical transmission system capable of controlling the transmission capacity and the signal processing load of a MIMO equalizer, without depending on the number of propagation modes of the optical fiber.

The optical transmission system according to the present invention further includes a controller configured to instruct the optical multiplexer to change the number M of the signal beams of light incident on the optical fiber or the number P of the P combined signals, and a measuring instrument configured to measure a signal quality of a demodulated signal of the M demodulated signals and notifies the controller of the number M of the signal beams of light and the number P of the P combined signals in order for the signal quality to exceed a threshold value.

The present optical transmission system may monitor the signal quality and feed a variation in signal quality back to the number M of the signal beams of light or the number P of the P combined signals to maintain a desired signal quality.

The signal generation apparatus of the optical transmission system according to the present invention is a switch configured to selects a received signal of the N received signals, a phase combiner configured to apply a phase rotation to the N received signals and add the resultant N received signals, or an amplitude combiner configured to change an intensity of a received signal of the N received signals to a certain intensity and add the resultant N received signals.

In this case, further provided are
- a controller configured to indicate, to the signal generation apparatus, the received signal of the N received signals to be selected by the switch, an amount of the phase rotation to be applied by the phase combiner, or the certain intensity to which the intensity of the received signal of the N received signals is to be changed by the amplitude combiner, in accordance with a configuration of the signal generation apparatus, and
- a measuring instrument configured to measure a signal quality of a demodulated signal of the M demodulated signals and notify the controller of the received signal to be selected, the amount of the phase rotation to be applied, or the certain intensity of the received signal in order for the signal quality to exceed a threshold value.

The present optical transmission system may monitor the signal quality and feed a variation in signal quality back to a calculation content of a configuration signal to maintain a desired signal quality.

The optical fiber of the optical transmission system according to the present invention may be a coupled multi-core fiber having inter-mode crosstalk of −30 dB/m or more. In the optical fiber, it is possible to randomly couple all propagation modes and achieve an MDL reduction effect.

Effects of the Invention

According to the present invention, it is possible to provide an optical transmission system capable of controlling a transmission capacity and a signal processing load of a MIMO equalizer, without depending on the number of propagation modes of an optical fiber.

DESCRIPTION OF EMBODIMENTS

Embodiments of the present invention will be described with reference to the accompanying drawings. The embodiments described below are examples of the present invention and the present invention is not limited to the embodiments described below. Note that components with the same reference signs in the specification and the drawings are assumed to be the same components.

First Embodiment

Figure 1:
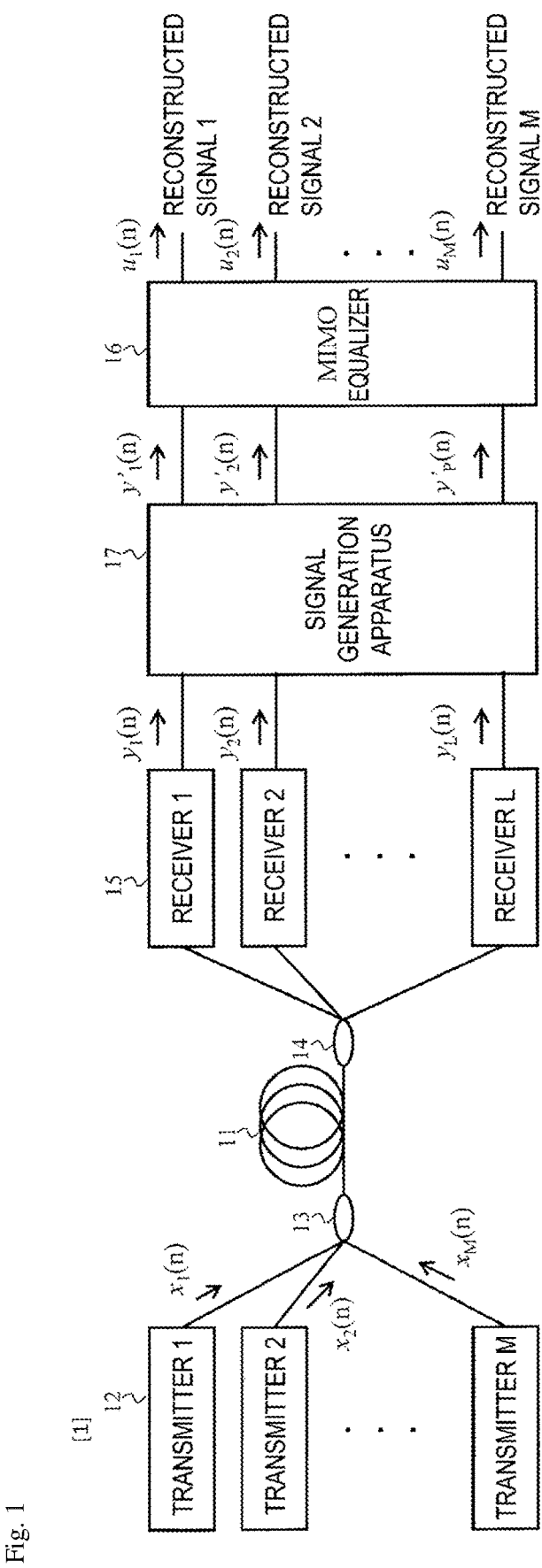
FIG. 1 is a diagram illustrating an optical transmission system according to the present invention.

FIG. 1 is a diagram illustrating an optical transmission system according to the present embodiment. The present optical transmission system includes an optical fiber 11 with the number of spatial modes being L (L is an integer of 2 or greater), an optical multiplexer 13 connected to one end of the optical fiber 11 and configured to input signal beams of light from M transmitters 12 (M is a natural number of L or less) to the optical fiber 11 and cause the input signal beams of light to be propagated for each of the spatial modes of the optical fiber 11, an optical demultiplexer 14 connected to another end of the optical fiber 11 and configured to demultiplex a propagated beam of light propagated through the optical fiber 11 for each of the spatial modes of the optical fiber 11, N (N=L) receivers 15 configured to each receive a demultiplexed beam of light obtained by demultiplexing the propagated beam of light demultiplexed by the optical demultiplexer 14, a signal generation apparatus 17 configured to receive N received signals output from the N receivers 15 and generates P combined signals (P is an integer of from M to L) from the N received signals, and a P×M MIMO equalizer 16 configured to receive the P combined signals output from the signal generation apparatus 17 to output M demodulated signals.

The optical fiber 11 is a multi-mode fiber or a multi-core fiber. M types of signal beams of light output by the M transmitters 12 are multiplexed by the optical multiplexer 13. The multiplexed signal beams of light are incident on each mode or each core of the optical fiber 11. Here, in a case where the optical fiber 11 is a multi-mode fiber, the optical multiplexer 13 is a mode multiplexer designed so that the input signal is coupled to a propagating mode (for example, NPL 5). In a case where the optical fiber 11 is a multi-core fiber, the optical multiplexer 13 is a fan-in device designed so that each signal is incident on each core (for example, NPL 6).

The optical demultiplexer 14 demultiplexes the signal beams of light propagated in each mode or by each core into N ports (N=L). The N receivers 15 respectively receive N types of signal beams of light resulting from the demultiplexing. The signal generation apparatus 17 generates P combined signals from L received signals received by the receivers 15. The MIMO equalizer 16 compensates for signal degradation caused in the optical fiber 11 and outputs M reconstructed signals. The MIMO equalizer 16 is also capable of compensating for a mode variance, a wavelength variance, and a polarization variance. In the present optical transmission system, a MIMO transmission with M inputs and M outputs is performed, making it possible to perform parallel transmission of M types of signals.

Note that when a polarization multiplexed signal is employed for a transmit signal, the polarization multiplexed signal is propagated on a per-port basis, and a 2M×2M MIMO equalizer is required to obtain M signals on the reception side. In the present embodiment, for the sake of simplicity, a case where the transmit signal is not the polarization multiplexed signal will be described.

In order to acquire an electric field amplitude and phase information of the received signal beam of light, it is only required to employ a receiver including a local oscillation light source, a 90° hybrid, a balance receiver, an analog-digital converter, and a computing machine, as the receivers 15 (for example, NPL 7).

Figure 2:
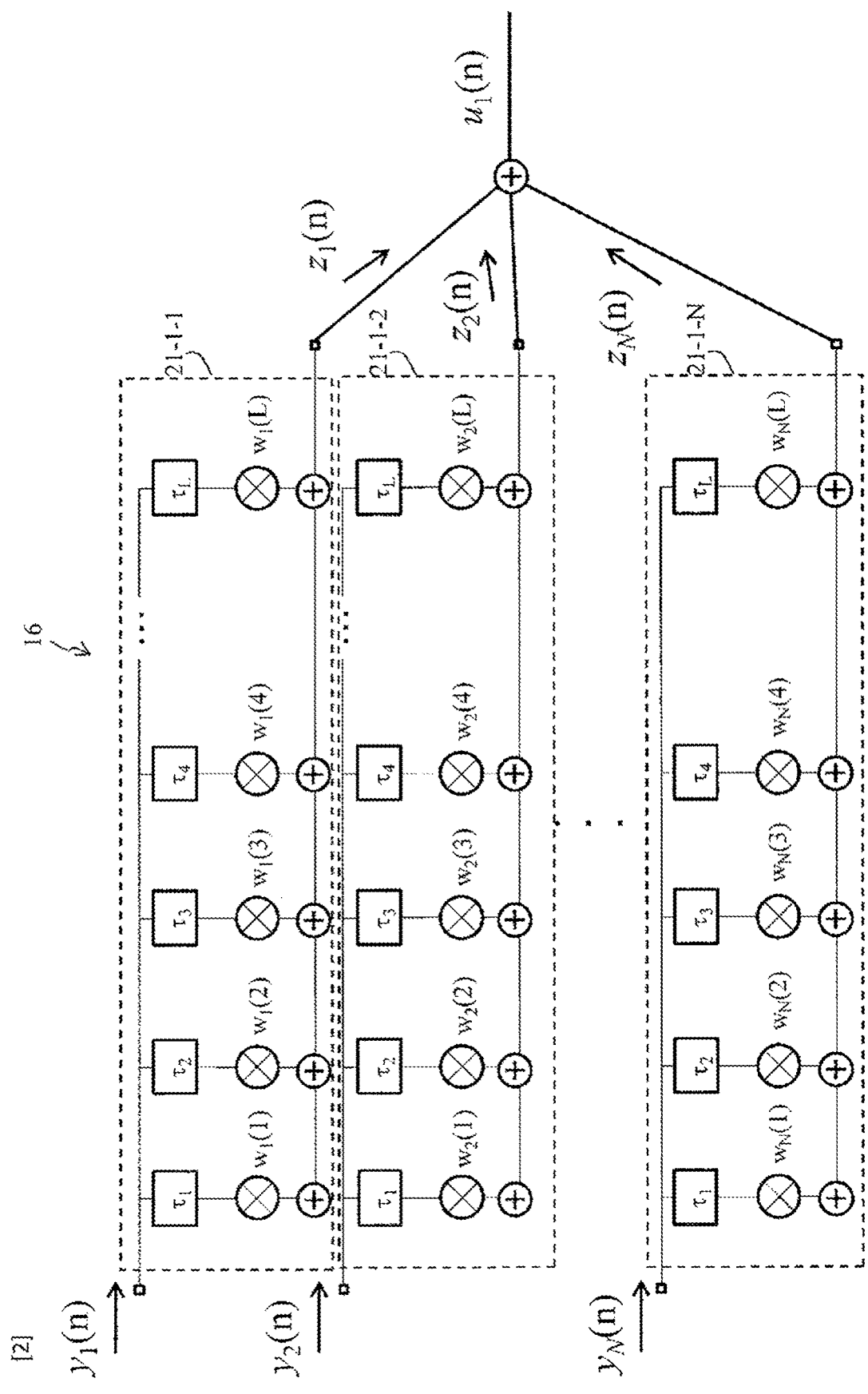
FIG. 2 is a diagram illustrating a MIMO equalizer provided in the optical transmission system according to the present invention.

FIG. 2 is a diagram illustrating the MIMO equalizer 16. Note that FIG. 2 illustrates one equalizer (signal processing unit) that reconstructs a signal transmitted by one of the transmitters 12, and the equalizer includes N FIR filters (21-1-1 to 21-1-N). That is, if there are M transmitters 12, M equalizers are needed, and the MIMO equalizer 16 needs to include N×M FIR filters 21-$m$-$n$ (1≤n≤N, 1≤m≤M).

Each of the FIR filters 21-$m$-$n$ is a signal processing circuit for restoring one of the transmit signals. The FIR filter 21 includes taps equal in number L of spatial modes of the optical fiber 11. Each of the taps includes a delay element with an amount of delay τ and a multiplier of a coefficient w (tap coefficient). In FIG. 2, delay amounts of the taps (1 to L) of the FIR filter 21-1-1 are represented respectively by $\tau_1$ to $\tau_L$, and coefficients are represented by $w_1(1)$ to $w_1(L)$. Output of each of the FIR filters 21-1-$n$ is finally combined.

Appropriate configuration of the delay amount τ and the coefficient w of the tap of each of the FIR filters 21-$m$-$n$ allows the MIMO equalizer 16 to compensate for signal degradation due to a mode variance, a wavelength variance, and a polarization mode variance, and crosstalk occurring in the optical fiber 11.

Figure 3:
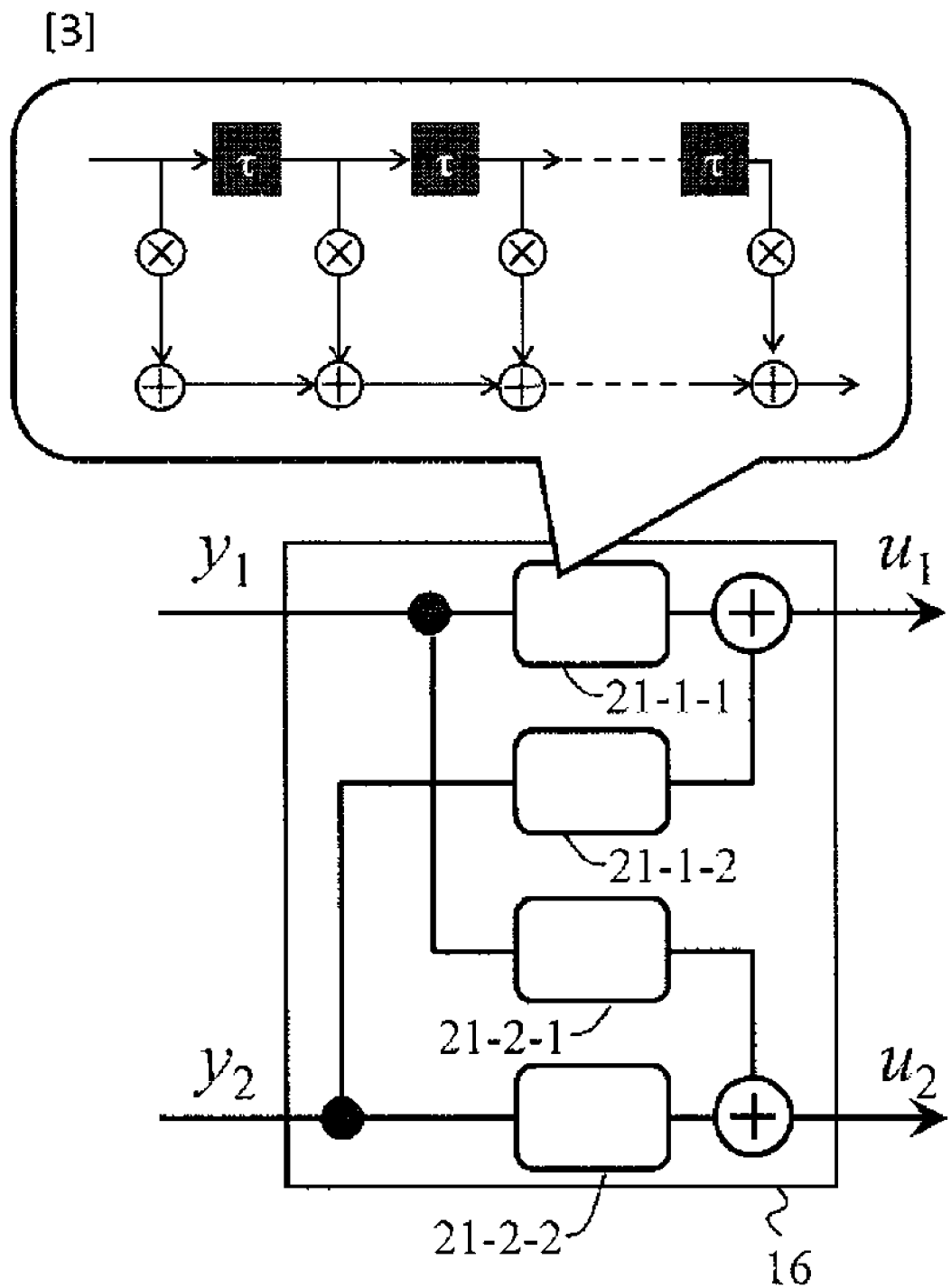
FIG. 3 is a diagram of a 2×2 MIMO equalizer.

FIG. 3 is a diagram illustrating the MIMO equalizer for restoring all the signals when M=N=2 in an example. The MIMO equalizer of FIG. 3 is an example MIMO equalizer that reconstructs all of the two transmit signals to output reconstructed signals ($u_1$, $u_2$). The MIMO equalizer of FIG. 3 includes the two signal processing units as described in FIG. 2. The number of the FIR filters 21 is M×N, and in this example, 2×2.

Figure 4:
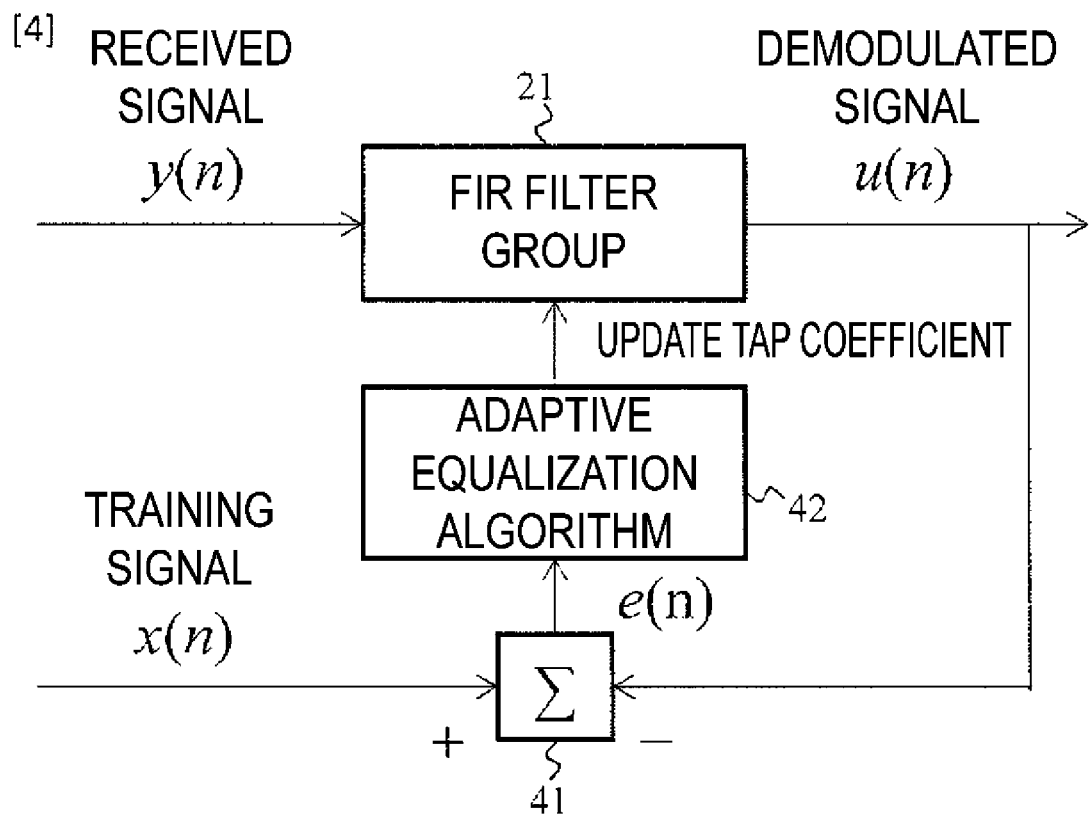
FIG. 4 is a diagram illustrating an application equalization.

FIG. 4 is a diagram illustrating an adaptive equalization algorithm for updating the tap coefficient. In addition to a data field, a known training symbol x(n) is added to the transmit signal. A comparison unit 41 compares a symbol of the transmit signal with a demodulated symbol to output an error e(n). An adaptation algorithm 42 controls the tap coefficient of the FIR filter so that the error e(n) is reduced.

When the same procedure is repeated by the number of training symbols, the error e(n) is minimized and the tap coefficient is determined. After determining the coefficient by using all of the training symbols, the data field in the posterior part of the transmit signal is reconstructed by using the tap coefficient determined by the FIR filter 21.

At this time, when the tap coefficient increases, an amount of calculation required to evaluate the correct tap coefficient increases. That is, when the number of signals input to the MIMO equalizer increases, a signal processing load in the MIMO equalizer increases accordingly.

An M-mode multiplexing optical transmission system using an existing MIMO equalizer includes M optical transmitters, an L-mode or L-core optical fiber, and N optical receivers, where L=M=N, and uses an M×M MIMO equalizer.

On the other hand, the optical transmission system according to the present embodiment includes M optical transmitters, an L-mode or L-core optical fiber, and N optical receivers, where N=L and M≤N, and further, L received signals received by the optical receivers are combined to reduce the number of signals to P (M≤P≤L), so that a P×M MIMO equalizer is employed. Thus, the optical transmission system of the present embodiment can realize a MIMO signal processing load in accordance with the transmission capacity.

EXAMPLE

With reference to figures onward from FIG. 5, a feature that allows the signal quality of the optical transmission system according to the present embodiment to be controlled will be described. The present optical transmission system is an example optical transmission system where the signal generation apparatus 17 selects P received signals from the L received signals and inputs the P received signals to the P×M MIMO equalizer 16.

Figure 5:
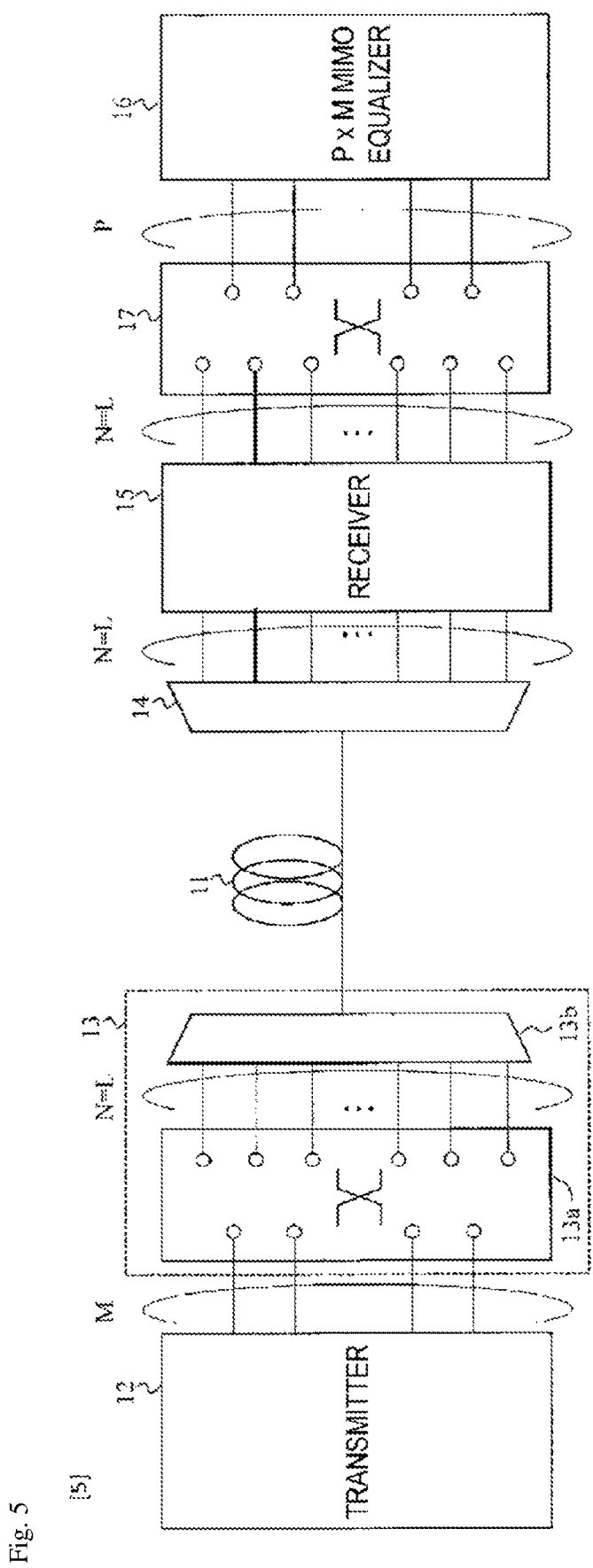
FIG. 5 is a diagram illustrating an optical transmission system according to the present invention.

FIG. 5 is a diagram illustrating a configuration of the present optical transmission system. In the present optical transmission system, a configuration is described in which in order to input M transmit signals to the optical fiber 11 with the number of spatial modes being L, the optical multiplexer 13 and the optical demultiplexer 14 are an L-mode multiplexer/demultiplexer or a fan-in/fan-out device in accordance with the number of cores. The optical multiplexer 13 selectively connects M transmit signals to an input end of an L port of the optical fiber 11. The optical multiplexer 13 and the optical demultiplexer 14 are a multiplexer/demultiplexer or a fan-in/fan-out device including M ports, and may have a configuration in which each of the M ports is connected to any one of the L ports of the optical fiber 11 (a configuration in which the optical fiber 11 has an unconnected port).

Furthermore, the optical multiplexer 13 may disperse and input the M transmit signals to the L ports of the optical fiber 11 (increase the number of signals from M to L).

The signal generation apparatus 17 generates P combined signals from the L received signals received by the receivers 15. In the present example, the signal generation apparatus 17 selects any P received signals from the L received signals to form combined signals. The P×M MIMO equalizer 16 reconstructs M transmit signals from the P combined signals.

In a case of an optical transmission system not including the signal generation unit but including an optical fiber through which the L mode propagates and an M×M MIMO equalizer, if M<L, it may not always be possible to reconstruct the transmit signals by the M×M MIMO equalizer, and the quality of the reconstructed signals varies. This is because, in a configuration where M<L, among the propagated optical signals, some of the light is not received by the receiver to lead to a loss or an increase in mode-dependent loss, resulting in a decrease in system performance. In the present optical transmission system, it is possible to extract an appropriate received signal by the signal generation unit and improve the quality of the reconstructed signals.

Next, an effect of the present optical transmission system will be described.

Figure 6:
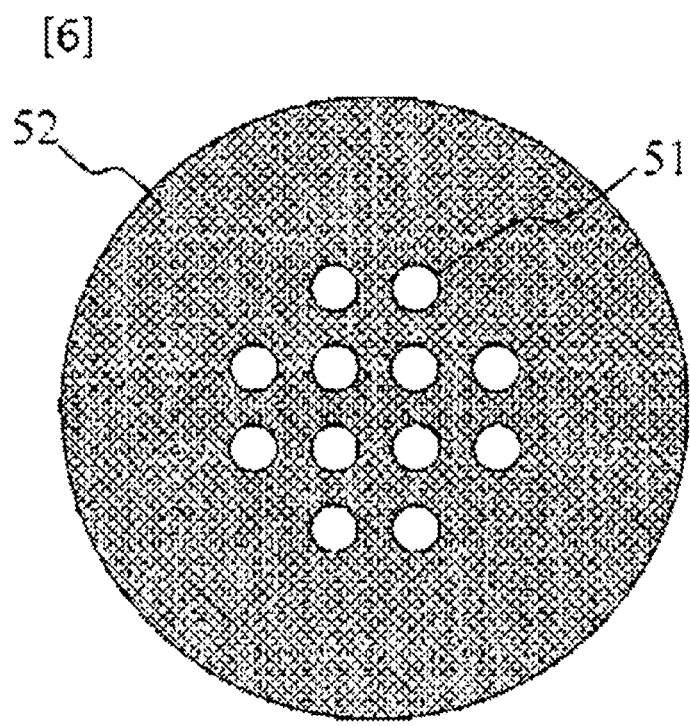
FIG. 6 is a cross-sectional view of a multi-core fiber.

FIG. 6 is a diagram illustrating a cross-section of the optical fiber 11. The optical fiber 11 is a multi-core fiber with 12 cores arranged in a square lattice shape. The optical fiber 11 has a core radius of 4.8 μm, a refractive index difference of the cores of 0.35%, and a core spacing of 16.4 μm. Each of the cores is structured with a single mode wave guide in bands C to L. That is, the optical fiber 11 is a fiber allowing for propagation of a total of 24 modes including a polarization mode (L=24).

Figure 7:
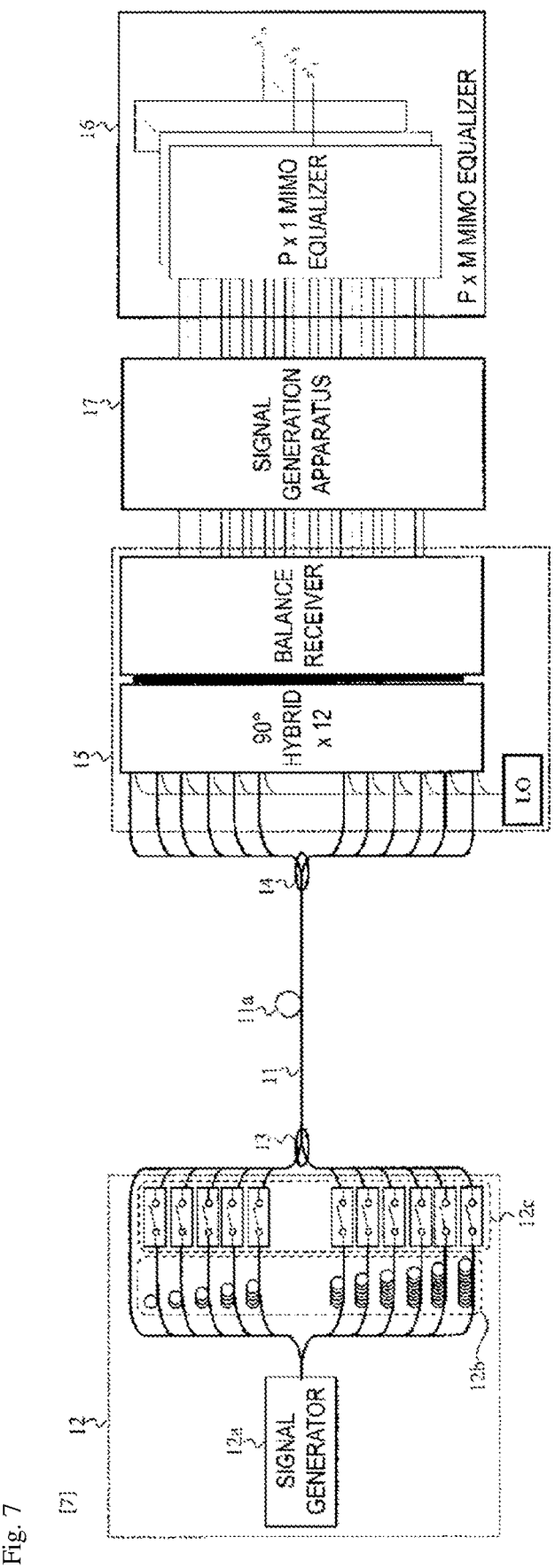
FIG. 7 is a diagram illustrating an optical transmission system according to the present invention.

FIG. 7 is a diagram illustrating a configuration of an experiment for verifying an MDL reduction effect of the optical transmission system according to the present embodiment. The transmitter 12 generates a polarization-multiplexed QPSK signal (1.25 Gb/s) in a signal generator 12a, splits the signal into 12 parts with a power coupler, and delays the split signal with delay lines 12b (for example, at intervals of 100 m) each having different lengths from each other to generate 12 signal beams of light. These signal beams of light are independent signal strings uncorrelated with each other in signal patterns. The transmitter 12 controls the number M of input signals by turning on and off an optical switch 12c.

The optical multiplexer 13 is a fan-in device that inputs these signal beams of light to each of the 12 cores of the optical fiber 11. There are 12 incident ports of the optical multiplexer 13 and polarization multiplexed signals will propagate through each of the ports. Thus, the present optical transmission system is configured so that M is an even number, but M may also be an odd number. The optical fiber 11 of FIG. 7 includes a bent portion 11a with a bending radius from 6 to 9 mm. Note that the bent portion 11a may not be provided.

The optical demultiplexer 14 is a fan-out device that inputs 24 types of propagated beams of light output from the 12 cores of the optical fiber 11 to the receivers 15. Such a receiver 15 is a coherent receiver including a 90° hybrid and a balance receiver. The receiver 15 receives the propagated beam of light, the signal generation apparatus 17 generates P signals from the received signals, and the P×M MIMO equalizer 16 reconstructs M signals.

Figure 8:
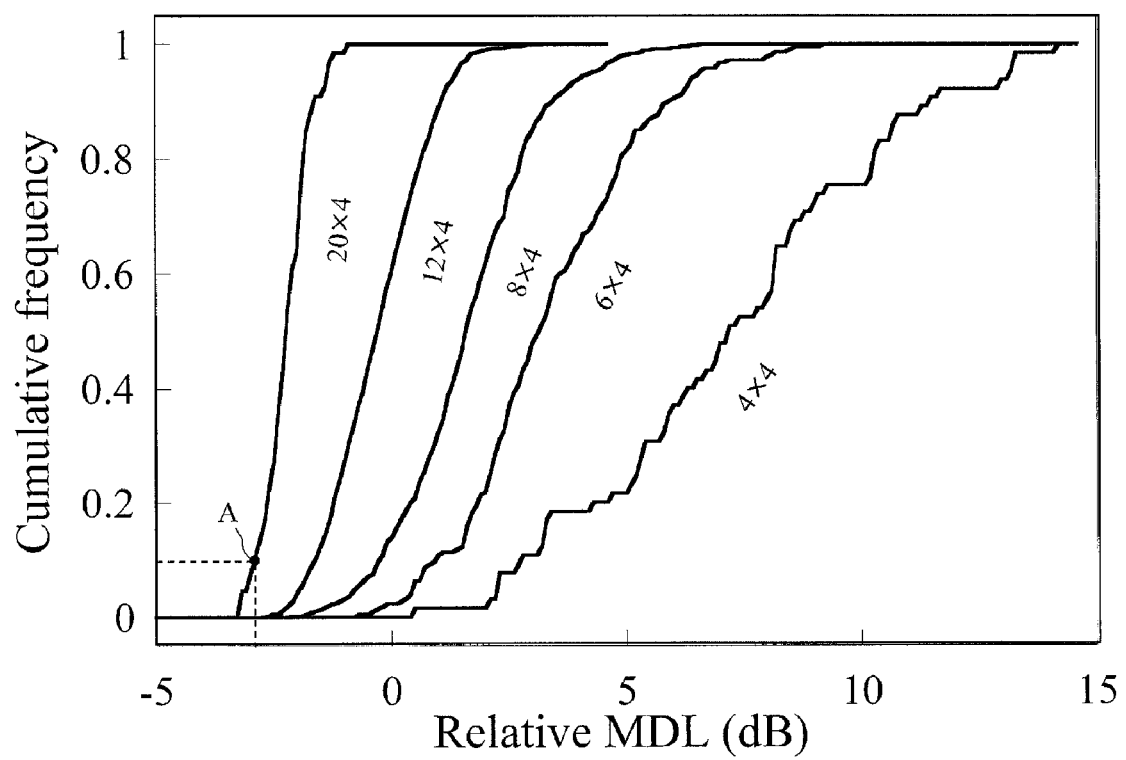
FIG. 8 is a graph illustrating an effect of the optical transmission system according to the present invention.

FIG. 8 is a graph illustrating a result of an experiment for evaluating a relationship between P and MDL when M=4. The horizontal axis in FIG. 8 indicates a difference between MDL when P is changed in the configuration of FIG. 7 and MDL in a 24×24 MIMO system having an existing configuration (this is referred to as "relative MDL value"). The horizontal axis indicates the relative MDL value in units of decibel, with respect to the MDL in the 24×24 MIMO system (0 dB). As the MDL difference is larger, the MDL deteriorates more significantly relative to the existing configuration.

Here, as for calculation of the MDL, as described in NPL 8, in M singular values λ1 to λM obtained by singular value decomposition of an M×M channel matrix of the transmission line, λ max indicating a maximum value and λ min indicating a minimum value may be used to determine the MDL according to the following equation:

$$\text{MDL (dB)} = 20 \log 10(\lambda \max / \lambda \min).$$

The vertical axis in FIG. 8 indicates a "cumulative frequency". The "cumulative frequency" means the content described below. If P<24, the number of combinations for selecting the received signals is $_{24}C_P$ (this is referred to as "total number of combinations"). For example, the vertical axis indicates the ratio of the number of combinations with the MDL difference smaller than −3 dB among the combinations of the received signals to the total number of combinations. Specifically, if P=20, point A in FIG. 8 means that the number of combinations of received signals with the relative MDL value smaller than −3 dB is 10% of the total number of combinations.

FIG. 8 indicates the following relationships. If P is increased, a variation range of the MDL due to the combination of the received signals decreases. For example, if P=20, the MDL is from −3.5 dB to −1.5 dB (a variation range of 2 dB) for any combination of received signals. However, if P=6, there are, for example, a combination of received signals resulting in −0.2 dB and a combination of received signals resulting in 9 dB, causing the relative MDL to have a large range of variation of 9.2 dB. That is, if P is small, this means that the MDL varies greatly depending on the combination of the received signals.

On the other hand, even if P is small (for example, P=M=4), when specific received signals are combined and reconstructed, MDL characteristics equivalent to those of the existing configuration can be achieved. Note that even if P=M=4, there are a few combinations of received signals in which the relative MDL value does not deteriorate significantly (for example, an amount of relative MDL deterioration is 1 dB or less).

Figure 9:
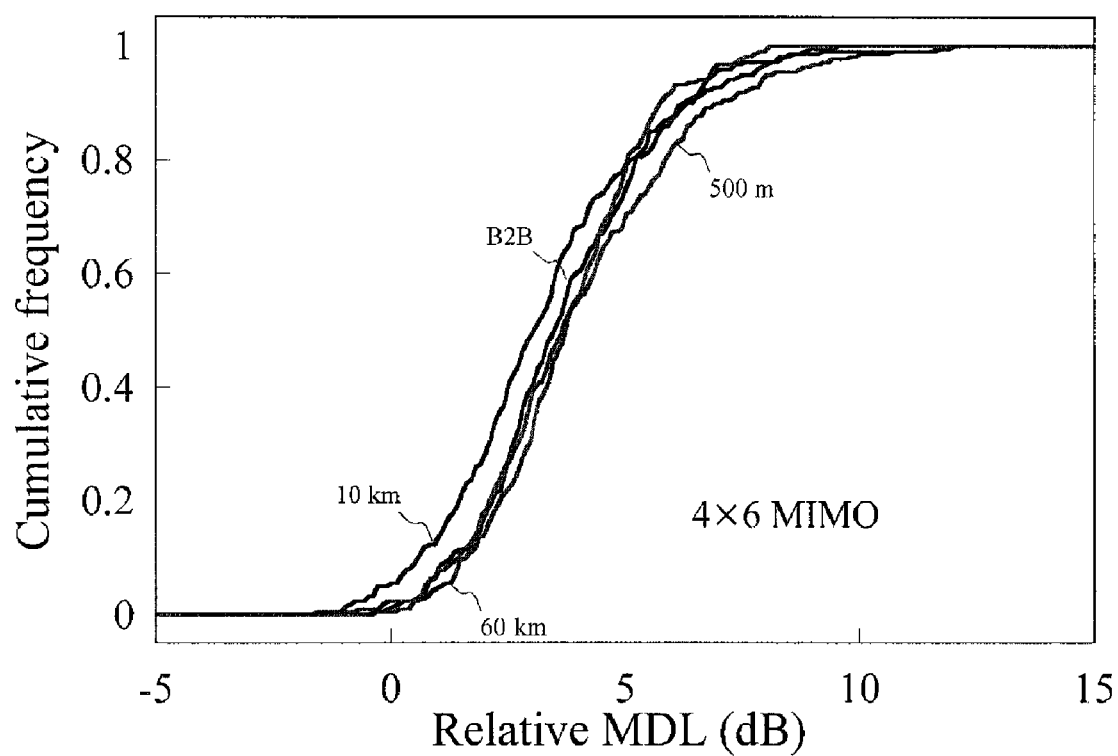
FIG. 9 is a graph illustrating an effect of the optical transmission system according to the present invention.

FIG. 9 is a graph illustrating a result of an experiment for evaluating a relationship between a length of the optical fiber 11 and the MDL when M=4 and P=6. The vertical axis and the horizontal axis of FIG. 9 are the same as the vertical axis and the horizontal axis of FIG. 8. The length of the optical fiber 11 was changed from several meters to 60 km. Note that "B2B" in the graph is an evaluation result when the length of the optical fiber 11 equals to several meters. With reference to FIG. 9, the cumulative frequency hardly changes even when the length of the optical fiber changes, and the MDL is considered to not be easily affected by the length of the optical fiber 11.

According to the results in FIGS. 8 and 9, it can be understood that, even when the number of signals input to the MIMO equalizer 16 by the signal generation apparatus 17 is reduced from L to P, appropriate selection of received signals used for signal processing allows the signals to be demodulated without quality degradation.

Here, it is desirable that P is designed so as to have values corresponding to a region where a reconstruction probability is sufficiently ensured, based on a maximum MDL design value (desired MDL value) that allows the signal to be reconstructed. For example, in FIG. 8, although there are a few frequencies (combinations of received signals) having a relative MDL value of zero in a 4×4 MIMO configuration, in the cumulative frequency varying slightly due to an external fluctuation (vibration, temperature change, and the like) affecting the optical transmission line, it can be expected that there are no combinations of received signals having a relative MDL value of zero. Thus, for example, it is desirable to design P corresponding to a region where the cumulative frequency is about 10% with respect to a desired MDL value. Specifically, in FIG. 8, it is only required for P to be eight with the cumulative frequency of about 10% if the relative MDL value is designed to be zero.

Furthermore, a region having a high cumulative frequency (for example, 90% or 99%) allows the desired MDL value to be achieved for almost all combinations of received signals, and thus, it is not necessary to select the received signal, and the configuration on a receiver side can be simplified without the need of the signal generation apparatus 17. Specifically, in FIG. 8, when the desired MDL is a relative MDL of zero, the cumulative frequency is almost 100% in a case of P=20, thus eliminating the need of the signal generation apparatus 17 (with a signal input to the MIMO equalizer 16 fixed as the output from a predetermined output port of the optical fiber 11).

Figure 10:
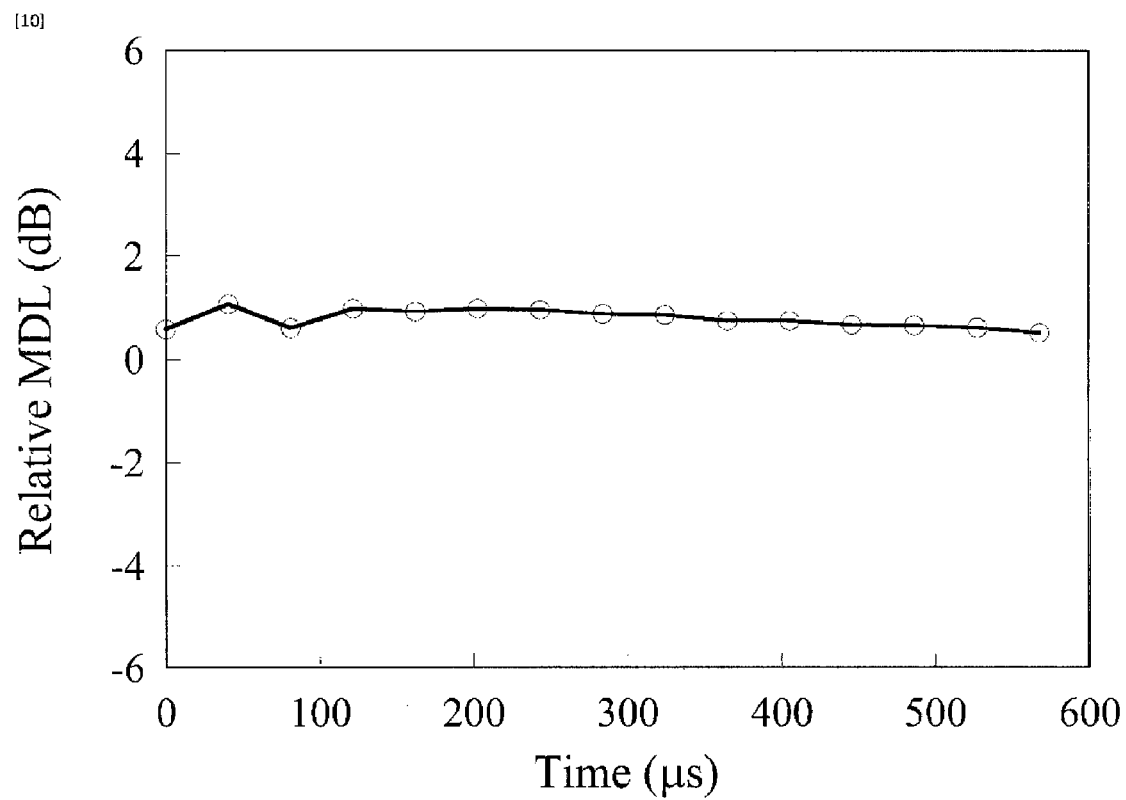
FIG. 10 is a graph illustrating an effect of the optical transmission system according to the present invention.

FIG. 10 is a graph illustrating a result of an experiment in which the change of MDL with respect to time is observed when M=P=4. In FIG. 10, the horizontal axis indicates time and the vertical axis indicates the relative MDL value. In the experiment, a combination of received signals with the least MDL is used. According to FIG. 10, it can be understood that in a combination of specific received signals with reduced MDL, the MDL is stable on the order of several hundred microseconds with respect to time.

That is, the MDL is stable for a certain period of time, and thus, the application equalization algorithm 42, included in the MIMO equalizer 16, for controlling received signals to be selected allows a combination of received signals for the desired MDL value to be realized without using the signal generation apparatus 17.

Figure 11:
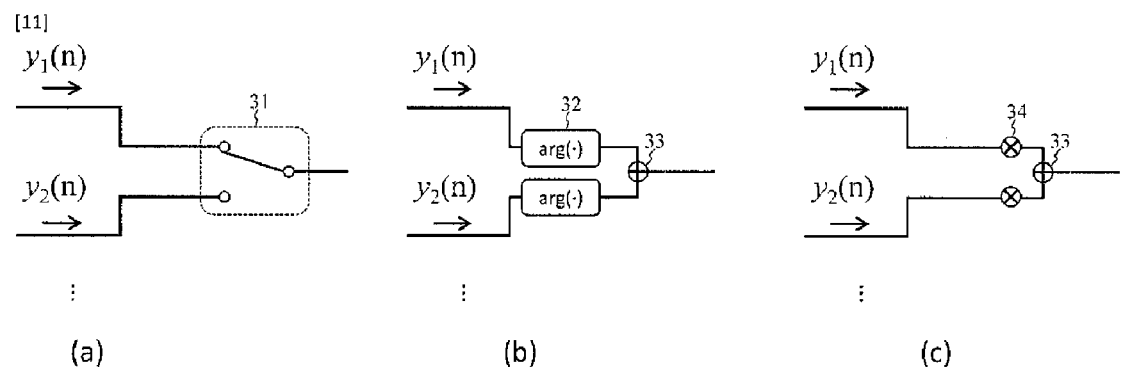
FIG. 11 is a diagram illustrating a signal generation apparatus of the optical transmission system according to the present invention.

FIG. 11(*a*) is a diagram illustrating a configuration of the signal generation apparatus 17 described in FIGS. 5 to 10. The signal generation apparatus 17 includes a plurality of switches 31 that select P signals from the N received signals described above.

Example 2

FIG. 11(*b*) is a diagram illustrating a configuration of the signal generation apparatus 17. The signal generation apparatus 17 includes phase rotation units 32 that apply phase rotation to the N (L) received signals, and an addition unit 33 that combines signals obtained by the phase rotation. In Example 1, the signal generation apparatus 17 simply selects received signals. However, in the present example, the signal generation apparatus 17 applies phase rotation to each of the L received signals and then combines the resultant signals to output P combined signals. If a rotation amount of each of the phase rotation units 32 is controlled, it is also possible to obtain the effect described in the first embodiment. That is, in the present optical transmission system, even when the number of signals input to the MIMO equalizer 16 by the signal generation apparatus 17 is reduced from L to P, appropriate phase rotation and combining of received signals used for signal processing allow the signals to be demodulated without quality degradation.

Example 3

Figure 12:
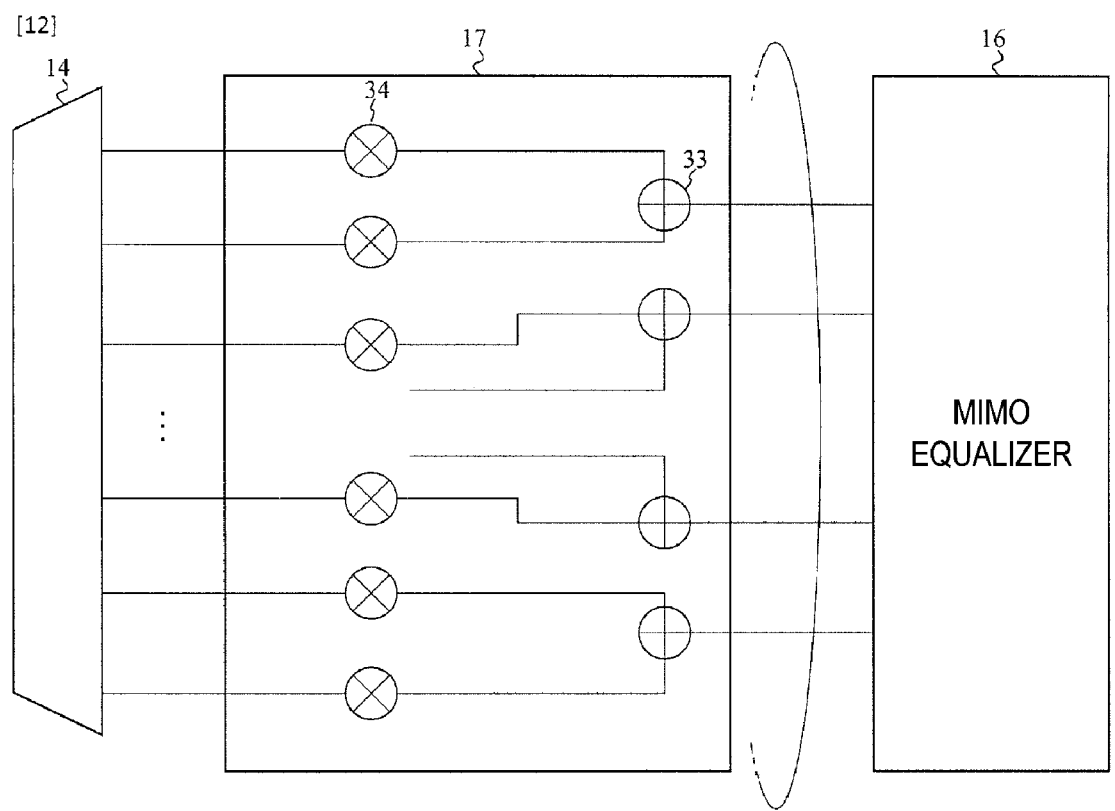
FIG. 12 is a diagram illustrating the signal generation apparatus of the optical transmission system according to the present invention.

FIG. 11(*c*) is a diagram illustrating a configuration of the signal generation apparatus 17. The signal generation apparatus 17 includes multipliers 34 that adjust an amplitude of each of the N (L) received signals, and the addition unit 33 that combines signals obtained by the amplitude adjustment. In Example 1, the signal generation apparatus 17 simply selects received signals. However, in the present example, the signal generation apparatus 17 adjusts an amplitude of each of the L received signals and then combines the resultant signals to output P combined signals. FIG. 12 is a diagram illustrating the signal generation apparatus 17 having the configuration of FIG. 11(c). The effect described in the first embodiment can be obtained by controlling a multiplication coefficient of each of the multipliers 34. That is, in the present optical transmission system, even when the number of signals input to the MIMO equalizer 16 by the signal generation apparatus 17 is reduced from L to P, the amplitude of the received signals used for signal processing is appropriately adjusted to combine the resultant signals, thus allowing the signals to be demodulated without quality degradation.

Example 4

In FIG. 11, a configuration in which any one of the two input signals is selected or the two input signals are combined is described. However, a configuration may be employed in which any one of three or greater signals is selected or three or greater signals are combined.

Example 5

In the examples described above, the number of ports of the input/output devices (the optical multiplexer 13 and the optical demultiplexer 14) to and from the optical fiber 11 is the number that allows M=N=L to be configured. However, in a configuration where M<L, it is only required that the input/output devices have a required number of ports. For example, in an optical transmission system in which polarization multiplexed signals are transmitted and received, the L-mode multi-core optical fiber 11 includes L/2 cores, and if the number of transmit signals is M, it is only required that the input/output devices include M/2 ports. An example of the optical multiplexer 13 includes a fan-in device that inputs a transmit signal only to M/2 cores.

Second Embodiment

In the optical communication system according to the first embodiment, the optical fiber 11 is a multi-mode fiber or a multi-core fiber. Here, when the optical fiber 11 is a coupled multi-core fiber as described in NPL 4, the following advantages are achieved.

In a case of the multi-mode fiber, propagating modes are coupled due to connection points and bent portions, but if a sufficient random coupling is not sufficient, the following problems arise. If signal beams of light for M-mode (M<L) are incident on an L-mode multi-mode fiber, a mode distribution may be biased within the optical fiber. Higher order modes within the optical fiber generally have lower optical characteristics than a fundamental mode. Thus, if the incident signal beam of light is distributed to a higher order mode, the improvement effect of the MDL described in the first embodiment may decrease.

On the other hand, in a case of the coupled multi-core fiber, all the propagation modes are randomly coupled along with the propagation. Thus, even when the signal beams of light for the M mode (M<L) are incident on the L-mode multi-core fiber, a sufficient coupling within the optical fiber causes the mode distribution to not be biased. Thus, when the coupled multi-core fiber is used for the optical fiber 11 of the optical transmission system explained in FIG. 1, the improvement effect of the MDL is obtained without any decrease.

As described in NPL 4 or 9, the coupled multi-core fiber has a characteristic in that the core spacing ranges from 16 µm to 25 µm, and a group delay spread increases with respect to a transmission distance in proportion to the square root of the distance.

Figure 13:
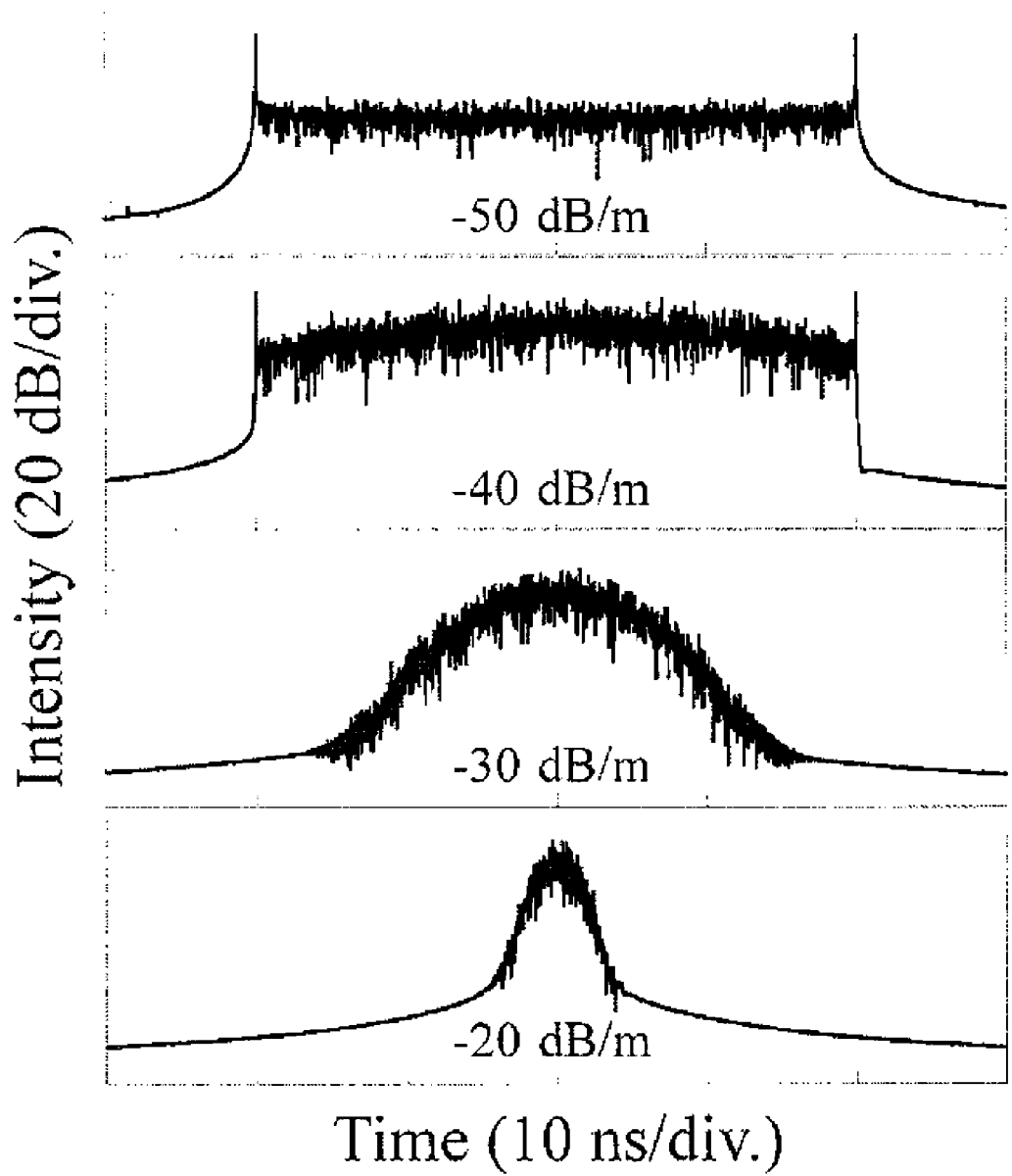
FIG. 13 is a graph illustrating calculation results of an inter-mode crosstalk and an impulse response waveform.

Here, what amount of coupling gives the random coupling to reduce the impulse response width is calculated. FIG. 13 is a graph illustrating a result obtained by calculating an impulse response shape obtained when the amount of coupling of a multi-core fiber is changed. A relay section interposed between optical amplifiers is generally 40 km or more, and therefore, a transmission distance is set to 40 km. The DMD between the modes is assumed to be 1 ns/km, for convenience.

In the case of the amount of coupling of −50 dB/m, a pulse indicating a large intensity is present on both ends, and a width of the pulse is 40 ns the same as of an accumulated DMD (1 ns/km×40 km). In the case of the amount of coupling of −40 dB/m, although the pulse intensity on both ends decreases, the impulse response width is the same as of the accumulated DMD.

On the other hand, in the case of the amount of coupling of −30 dB/m, the impulse response shape is a Gaussian shape. It is well known that in a case that the inter-mode coupling is strong, the impulse response shape is a Gaussian shape. In the case of the amount of coupling of −20 dB/km, it can be seen that the Gaussian shape is similarly obtained, but a width thereof is further smaller.

As described above, it can be thought that the random coupling occurs in the region of the amount of coupling of −30 dB/m or more where it is possible to reduce the impulse response width. If the amount of coupling is −20 dB/m, a more random coupling occurs, which is more desirable.

Third Embodiment

Figure 14:
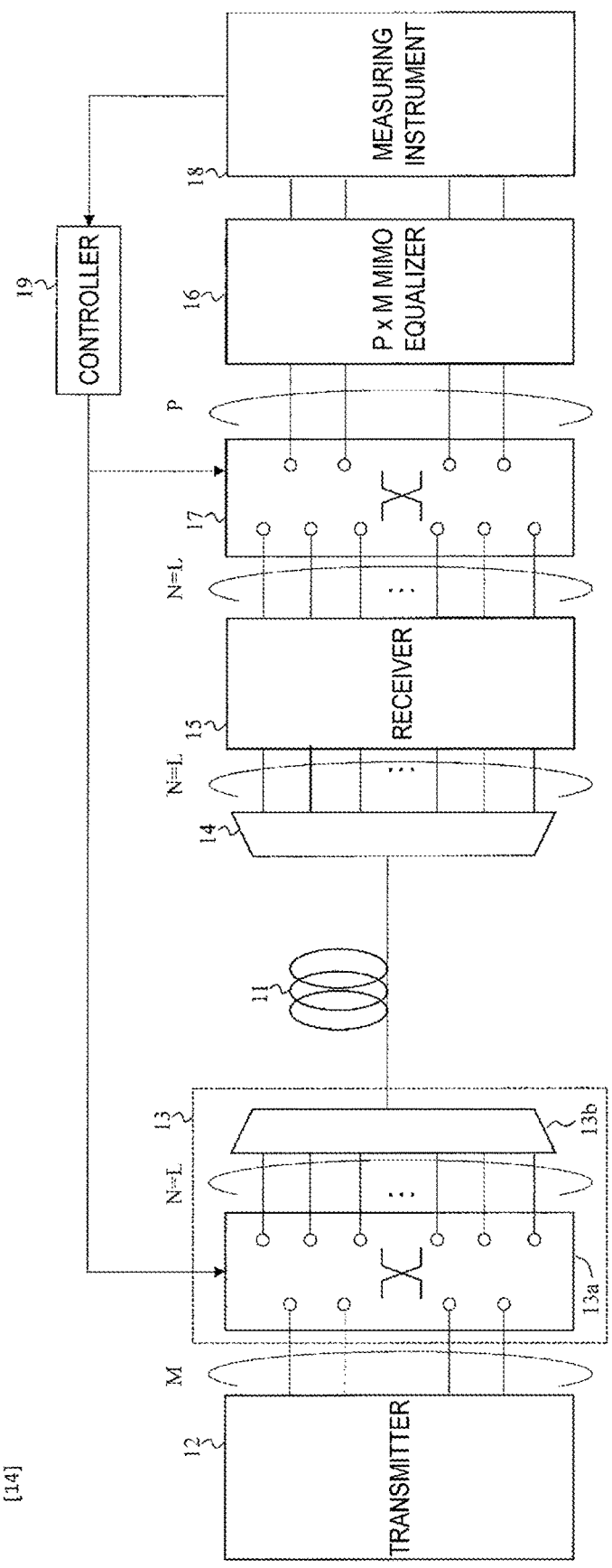
FIG. 14 is a diagram illustrating an optical transmission system according to the present invention.

FIG. 14 is a diagram illustrating an optical transmission system according to the present embodiment. In the present optical transmission system, a controller 19 and a measuring instrument 18 are further provided in the optical transmission system of FIGS. 1 and 5.

For example, the controller 19 instructs the optical multiplexer 13 to change the number M of the signal beams of light incident on the optical fiber 11. The measuring instrument 18 measures a signal quality of the demodulated signal and notifies the controller 19 of the number M of the signal beams of light so that the signal quality exceeds a threshold value.

Specifically, the optical multiplexer 13 includes a multiplexing unit 13b that serves as a mode multiplexer if the optical fiber 11 is a multi-mode fiber and as a fan-in device if the optical fiber 11 is a multi-core fiber, and an optical switch 13a used to input signal beams of light into any M ports from among N ports of the multiplexing unit 13b.

It is possible to control a transmission capacity and a signal quality by changing the number M of signal beams of light propagated through the optical fiber 11. In this case, it is difficult to replace a hardware configuration such as a mode multiplexer and a fan-in device. Thus, when the optical multiplexer 13 has a function (the optical switch 13a) of changing the number M of signal beams of light incident on the optical fiber 11, it is possible to eliminate the need for replacing the devices. For example, the number M of signal beams of light is dynamically changed according to a temporal change of a transmission capacity demand by using the optical switch 13a, thus allowing a system performance to be changed without changing the hardware of the optical transmission line system.

For example, the controller 19 instructs the signal generation apparatus 17 to change the number P of the combined signals. The measuring instrument 18 measures the signal quality of the demodulated signal and notifies the controller 19 of the number P of the combined signals so that the signal quality exceeds a threshold value.

As described in Example 1 of the first embodiment, the MDL value can be controlled by changing the number P of the combined signals. In this case, it is difficult to replace a hardware configuration such as a mode demultiplexer and a fan-out device. Thus, if the switch 31 of the signal generation apparatus 17 dynamically selects, on the basis of a measurement result of the measuring instrument 18, the received signals so as to obtain a desired MDL value, it is possible to eliminate the need for device replacement. That is, it is possible to change a system performance without changing the hardware of the optical transmission line system.

For example, the controller 19 indicates, to the signal generation apparatus 17, an amount of the phase rotation to be applied by the phase rotation unit 32 or an intensity of the received signal to be changed by the multiplier 34. The measuring instrument 18 measures the signal quality of the demodulated signal and notifies the controller 19 of the amount of the phase rotation to be applied or the intensity of the received signal so that the signal quality exceeds a threshold value.

As described in Examples 2 and 3 of the first embodiment, the MDL value can be controlled by changing the amount of the phase rotation or the intensity of the received signal. In this case, it is difficult to replace a hardware configuration such as a circuit and a device. Thus, if the phase rotation unit 32 and the multiplier 34 of the signal generation apparatus 17 dynamically adjust, on the basis of a measurement result of the measuring instrument 18, a phase and an intensity of the received signals so as to obtain a desired MDL value, it is possible to eliminate the need for device replacement. That is, it is possible to change a system performance without changing the hardware of the optical transmission line system.

APPENDIX

An optical transmission system according to the present embodiment is described below.

(1) The present optical transmission system includes
M transmitters (M is an integer of 2 or greater), L receivers (L is an integer of M or greater), an optical fiber (for example, a few mode fiber, a multi-core fiber, and a few mode multi-core fiber) connected between the M transmitters and the L receivers and capable of propagating L spatial modes, and
a mode multiplexer/demultiplexer (a fan-in/fan-out device in a case of multi-core fiber) connected to input/output ends of the optical fiber, wherein
the mode multiplexer has a function of coupling signal beams of light from the M transmitters (M is an integer) to a mode in the optical fiber,
the mode demultiplexer serving as L output ports demultiplexes propagation mode light of the optical fiber,
a signal generation apparatus is included that generates P signals (P is an integer of from M to L) from L received signals,
the MIMO receiver is included that inputs the obtained P signals to a P×M MIMO equalizer to output M demodulated signals, and
M is set equal to a value ranging from 2 to L, and P is set equal to a value ranging from M to L.

(2) In the optical transmission system according to (1) above, the signal generation apparatus uses an adder/multiplier to multiply/add L output signals by a coefficient to create P signals and inputs the P signals to the P×M MIMO equalizer to output M demodulated signals.

(3) In the optical transmission system according to (2) above, the coefficient of the adder/multiplier dynamically changes so that a quality of the demodulated signals is equal to or greater than a desired value.

(4) In the optical transmission system according to (2) to (3) above, M and P are controlled so that the quality of the demodulated signals is equal to or greater than a desired value.

(5) In the optical transmission system according to (1) to (4) above, the optical fiber is a multi-core fiber having two or greater cores.

(6) The optical transmission system according to (5) above is a coupled multi-core fiber with an impulse response width of the optical fiber increasing in proportion to the square root of a distance, that is, the coupled multi-core fiber has an inter-mode crosstalk of −30 dB/m or greater.

Effect

In the optical transmission system according to the present invention, it is possible to control the transmission capacity and the signal processing load of a MIMO equalizer, without depending on the number of propagation modes of the optical fiber. Furthermore, in the optical transmission system according to the present invention, it is possible to dynamically optimize performance in accordance with a transmission capacity demand and quality, without changing an optical transmission line, and thus, the system performance can be maximized. That is, the optical transmission system according to the present invention is capable of reducing the number of signals input to the MIMO equalizer from the number of spatial modes of the optical fiber to a certain number that allows a desired MDL to be maintained, to reduce the MIMO processing load.

INDUSTRIAL APPLICABILITY

The present invention can be used as a transmission medium in an optical transmission system.

REFERENCE SIGNS LIST

11: Optical fiber
12: Transmitter
12a: Signal generator
12b: Delay line
12c: Optical switch
13: Optical multiplexer
13a: Optical switch
13b: Optical multiplexing unit
14: Optical demultiplexer
15: Receiver
16: P×M MINO equalizer
17: Signal generation apparatus
18: Measuring instrument
19: Controller
21, 21-1-1, . . . , 21-m-n, . . . 21-M-N: FIR filter
31: Switch
32: Phase rotation unit
33: Adder 34: Multiplier
41: Comparison unit
42: Adaptive equalization algorithm
51: Core
52: Clad

The invention claimed is:

1. An optical transmission system, comprising:
an optical fiber with a number of spatial modes being L, where the L is an integer of at least 2;
an optical multiplexer connected to one end of the optical fiber, the optical multiplexer being configured to:
receive M of a transmitted signal beam of light from a transmitter, where the M is a natural number in a range from 1 to L;
convert the M of the transmitted signal beam of light into the L of input signal beams of light; and
input the L of the input signal beams of light to the optical fiber to cause the L of the input signal beams of light to be propagated for each of the spatial modes of the optical fiber as a propagated beam of light;
an optical demultiplexer connected to another end of the optical fiber, the optical demultiplexer being configured to demultiplex the propagated beam of light to generate N of demultiplexed beams of light, where the N is equal to the L;
a receiver configured to:
receive the N of the demultiplexed beams of light from the optical demultiplexer; and
output the N of received signals corresponding to the N of the demultiplexed beams of light;
a signal generation apparatus configured to:
receive the N of the received signals from the receiver; and
convert the N of the received signals into P of a combined signal as a conversion, where the P is an integer of M or more and less than L; and
a P×M multiple-input multiple-output equalizer configured to receive the P of the combined signal from the signal generation apparatus to output the M of a demodulated signal,
wherein the signal generation apparatus is configured to:
either apply phase rotation to or adjust an amplitude of two received signals of the N of the received signals to obtain two modified signals as a first step of the conversion; and
combine the two modified signals as a second step of the conversion to generate one combined signal of the P of the combined signal.

2. The optical transmission system according to claim 1, further comprising:
a measuring instrument configured to:
receive the M of the demodulated signal from the P×M multiple-input multiple-output equalizer; and
measure a signal quality of the M of the demodulated signal to obtain a measurement result; and
a controller configured to instruct the optical multiplexer to change the M of the transmitted signal beam of light to another natural number in the range from 1 to L in response to the measurement result.

3. The optical transmission system according to claim 1, further comprising:
a measuring instrument configured to:
receive the M of the demodulated signal from the P×M multiple-input multiple-output equalizer; and
measure a signal quality of the M of the demodulated signal to obtain a measurement result; and
a controller configured to instruct the signal generation apparatus to change the P of the combined signal to another integer in response to the measurement result.

4. The optical transmission system according to claim 1, further comprising:
a measuring instrument configured to:
receive the M of the demodulated signal from the P×M multiple-input multiple-output equalizer; and
measure a signal quality of the M of the demodulated signal to obtain a measurement result; and
a controller configured to instruct the signal generation apparatus an amount of the phase rotation or an amount of the adjustment of the amplitude of the two received signals of the N of the received signals in response to the measurement result.

5. The optical transmission system according to claim 1, wherein the optical fiber is a coupled multi-core fiber having inter-mode crosstalk of at least −30 dB/m.

6. The optical transmission system according to claim 2, wherein the controller is further configured to instruct the signal generation apparatus to change the P of the combined signal to another integer in response to the measurement result.

7. The optical transmission system according to claim 2, wherein the controller is further configured to instruct the signal generation apparatus an amount of the phase rotation or an adjustment amount of the amplitude of the two received signals of the N of the received signals in response to the measurement result.

8. The optical transmission system according to claim 3, wherein the controller is further configured to instruct the signal generation apparatus an amount of the phase rotation or an adjustment amount of the amplitude of the two received signals of the N of the received signals in response to the measurement result.

9. The optical transmission system according to claim 2, wherein the optical fiber is a coupled multi-core fiber having inter-mode crosstalk of at least −30 dB/m.

10. The optical transmission system according to claim 3, wherein the optical fiber is a coupled multi-core fiber having inter-mode crosstalk of at least −30 dB/m.

11. The optical transmission system according to claim 4, wherein the optical fiber is a coupled multi-core fiber having inter-mode crosstalk of at least −30 dB/m.

12. The optical transmission system according to claim 1, wherein the L is the integer in the range from 2 to 24.

13. The optical transmission system according to claim 5, wherein the inter-mode crosstalk is in a range from −30 dB/m to −20 dB/m.

14. The optical transmission system according to claim 9, wherein the inter-mode crosstalk is in a range from −30 dB/m to −20 dB/m.

15. The optical transmission system according to claim 10, wherein the inter-mode crosstalk is in a range of −20 dB/m to −30 dB/m.

16. The optical transmission system according to claim 11, wherein the inter-mode crosstalk is in a range from −30 dB/m to −20 dB/m.

* * * * *